United States Patent
Salamon et al.

[11] 3,708,765
[45] Jan. 2, 1972

[54] FUNCTION GENERATOR FOR PROVIDING PULSE WIDTH MODULATION

[75] Inventors: Wolfgang Salamon; Rolf Lother, both of Bremen, Germany

[73] Assignee: Vereinigte Flugtechnische Werke Fokker GmbH, Bremen, Germany

[22] Filed: Jan. 13, 1971

[21] Appl. No.: 106,019

[30] Foreign Application Priority Data

Jan. 28, 1970 Germany..................P 20 03 587.4

[52] U.S. Cl..................332/9 R, 307/265, 318/341, 328/58, 332/14
[51] Int. Cl..........................................H03k 7/08
[58] Field of Search............332/9, 9 T, 14; 307/265; 328/58; 325/142; 318/341

[56] References Cited

UNITED STATES PATENTS

| | | | |
|---|---|---|---|
| 3,453,562 | 7/1969 | Magnuski | 307/265 X |
| 3,449,695 | 6/1969 | Marsh | 332/14 X |
| 3,260,912 | 7/1966 | Gregory | 318/341 |
| 3,514,708 | 5/1970 | DeBretagne et al. | 332/9 R X |

*Primary Examiner*—Alfred L. Brody
*Attorney*—Smyth, Roston & Pavitt

[57] ABSTRACT

A feedback control system with transfer function control by means of a control apparatus providing switching pulses for such control and using these pulses additionally in an internal feedback configuration for function processing a control signal which ultimately is to control the transfer function of the control system. Control system and control apparatus are linked by a line providing switching pulses from the latter to the former.

13 Claims, 3 Drawing Figures

FUNCTION GENERATOR FOR PROVIDING PULSE WIDTH MODULATION

The present invention relates to control apparatus for production of a pulse train having variable pulse width, whereby the pulse width is controlled by a voltage in dependence upon a predetermined function.

In copending application Ser. No. 83,492, filed Oct. 23, 1970, of common assignee, utilization of a train of pulses of variable width is suggested, for obtaining effective variation of resistivity in a network. The pulse width is determined by a control voltage. In particular, the pulse train provides periodic on-off control, e.g., of a transistor having its main electrodes connected across a resistor. As the resistor is, thus, periodically short circuited, its apparent or effective resistance is determined by the resistance proper multiplied by the duty factor of the switching transistor. The duty factor is given by the ratio of the short circuiting period over the repetition or pulse rate period of the train. The duty factor is, thus, determined by the relative width of the pulses in the train, and the width, in turn, is controlled in dependence upon a control voltage.

As also set forth in said copending application, such effective control of resistance is important in control circuits used in feedback systems, collectively called controllers and which are subject to the condition that the operating parameters have to be changed. Operational amplifiers are frequently used in such control circuits, which include a feedback network that determines, e.g., gain. This network is controlled for gain control in dependence upon a control voltage (other than the amplifier input proper). The controlled variation of effective resistivity in the external amplifier circuitry is instrumental here, effective resistivity being controlled as described. It was found that parameter control provided in that manner is particularly valuable in redundancy systems for aircraft control. As the parameters can, thus, be very accurately adjusted, the plural, parallely operating controllers can be made to operate parallely in precise synchronism.

In cases, a parameter of such an amplifier must be changed in accordance with a particular function, so that the pulse width variation must be made to follow such a function to provide the desired effective resistance control. As the function may be of any kind, a function generator or translator is needed capable of translating such arbitrary function signal into pulse width variations. It is an object of the invention to provide for pulse width variations in accordance with arbitrary functions represented by a control voltage whose amplitude represents that function. In particular, a control circuit is to be provided that establishes a train of switching pulses for effective resistance control, e.g., in a controller, so that the transfer function thereof varies. The width of the switching pulses, i.e., the duty factor of the switching operation is to be modulated in dependence upon a control signal but in a complex function relation so that the transfer function of the controller varies with the control voltage as desired.

In accordance with the present invention, a control apparatus for providing such width modulated switching pulses is suggested, having a pulse generator and an input network that responds to both an external control signal and the train of switching pulses produced by the pulse generator to obtain internal feedback configuration in the control apparatus, thereby obtaining a particular train of switching pulses whose width is being modulated in dependence upon control signals. In other words, a control apparatus is provided to produce variable width switching pulses in dependence upon an input control signal whereby internal feedback permits generation of a generalized dependency for between pulse width and control input, for modulating the former with the latter on the basis of an arbitrary function. The control apparatus, particularly the input network thereof, has its own transfer function which is controlled by the switching pulses as produced. The switching pulses may be used in a controller for transfer function control therein.

In a more detailed configuration, the control apparatus is subject to input control by the train of switching pulses as well as the complementary train, and the two trains individually vary effective resistance in one input network through which the control signal is applied, and in a second network through which a biasing signal is applied to the pulse generator. The networks permit the pulse generator output to be predetermined as to three points or values of the relation between controller transfer function and switching pulse width on one hand, and three discrete control signals as inputs for the control apparatus on the other hand. This way, the resistances in the input network for the pulse generator in the control apparatus can be determined, and the apparatus then provides the desired relation between control signal and transfer function of the controller via the train of width controlled switching pulses.

The pulse width control has no hysteresis, is very constant in its behavior, reproduces the same relation for the same input at a high degree of accuracy and remains independent from temperature. The rise time of the switching pulses must be large relative to the pulse operated electronic switching element when conductive, and small when non-conductive.

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

Figure 1:
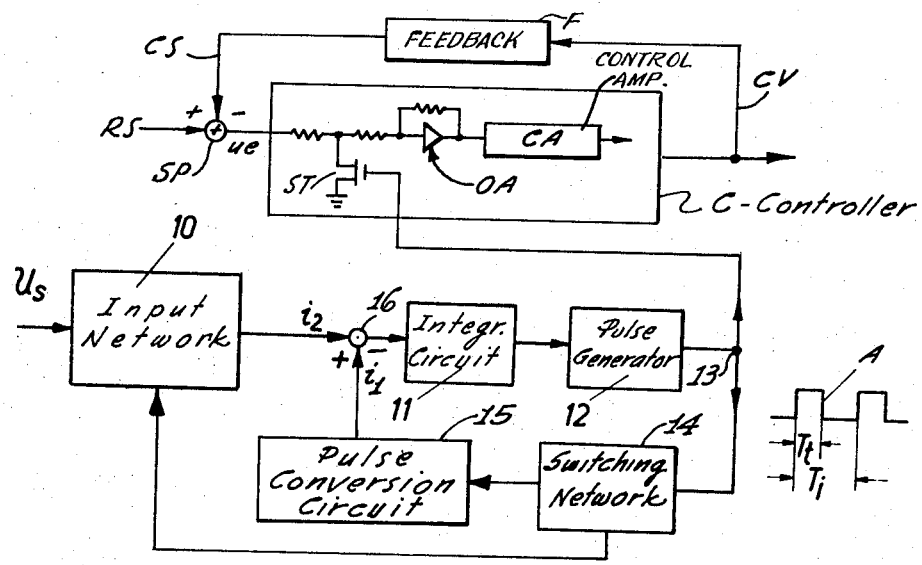
FIG. 1 is a block diagram of the control apparatus of the invention shown together with an example of a controller whose transfer function is subject to control.

Proceeding now to the detailed description of the drawings, we turn first to the upper part of FIG. 1; there is illustrated a basic feedback control loop to provide a signal or action that is, or is represented by, a controlled variable CV (e.g., rudder deflection etc. in an aircraft). The controlled variable CV is provided by an assembly of control and actuation elements collectively denoted as controller C. The controlled variable CV is fed back to feedback means F, and a control signal CS, that is representative of the controlled variable or of the effect the controlled variable has produced, is applied to a summing point SP. A reference signal RS is fed as command to summing point SP. As a consequence, an error signal, such as a voltage Ue, is developed on the output of summing point, and processed in controller C so as to provide the controlled variable CV.

Details of controller C are not required, but it is understood that the controller may be a proportioning and/or reset action controller, with or without superimposed rate action. The operation of controller C can be described generally by a transfer function $CF = F(Ue)$. It may now be desirable under the specific conditions of any particular case, that the transfer function F itself is to be dependent upon another variable represented, for example, by a voltage $Us$. As is generally known, the transfer function includes overall gain or relative gain of the various type actions, and the time constants of integral and rate actions. As disclosed in the copending application, these parameters can be controlled individually through particular resistance control within the controller. Upon controlling one or more parameters, the transfer function of controller C is being controlled therewith.

By way of example, the gain of a control amplifier CA, included in controller C, may be controlled by an operational amplifier OA connected in front and having its resistance network subjected to pulse control. For example, a switching transistor ST controls periodically connection of a junction between input resistances to ground. The transistor ST is controlled by a pulse train A, having a particular pulse rate frequency, each pulse having particular width. Pulse width $T_t$ and the period $T_i$ corresponding to rate frequency determine the duty factor $T_t/T_i$ of the switching operation. The effective resistance in the network of operational amplifier OA and, therefore, the gain of the amplifier, in turn, depends on that duty factor. Upon variation of pulse width, the duty factor of switching changes, so do the gain of amplifier OA and the transfer function of controller C.

The circuit that is the subject of this invention and which is explained by way of example below, provides control of the transfer function in a complex fashion, in that the transfer function be controlled through selection of the width ($T_t$) of pulses A which, in turn, are particularly controlled in response to a control signal $Us$. In terms of transfer function, a particular relation $F = f(Us) = G(A(Us))$ is to be established wherein the function $G(A)$ denotes the response of the controller C to variations in the width of pulses $A$. $A(Us)$ represents the functional relation between control signal $Us$ and pulse width. The function $G$ is inherent in the construction of controller C; the control apparatus to be described next establishes the function $A = A(Us)$, so that a relation $F = f(Us)$ be obtained that represents the desired relation between transfer function of the controller and control signal $Us$.

The lower portion of FIG. 1 shows that control apparatus which includes an input circuit or network 10 for processing the input voltage $Us$ before application to an integrating control circuit 11. Circuit 11 has its output connected to a pulse generator 12, the output terminal 13 of which provides pulse train A, the pulses having variable width. $T_t/T_i$ is the duty factor of the switching action provided by pulse A in transistor ST.

Aside from extracting train A from the circuit for use in controller C, the output of generator 12 is fed also to an electronic switching circuit 14 for control of and in input network 10. Additionally, switching circuit 14 operates a second resistive circuit 15 to be described in detail below. A summing point 16 combines the output currents $i_2$ and $i_1$ of circuits 10 and 15 respectively at indicated polarities. The combined signal becomes effective in integrator 11 as input thereof. Circuits 10, 15 and 16 provide the generalized input network for the pulse generator. As there is a feedback loop, interposed integrator 11 provides for reset action within the control apparatus.

Figure 2:
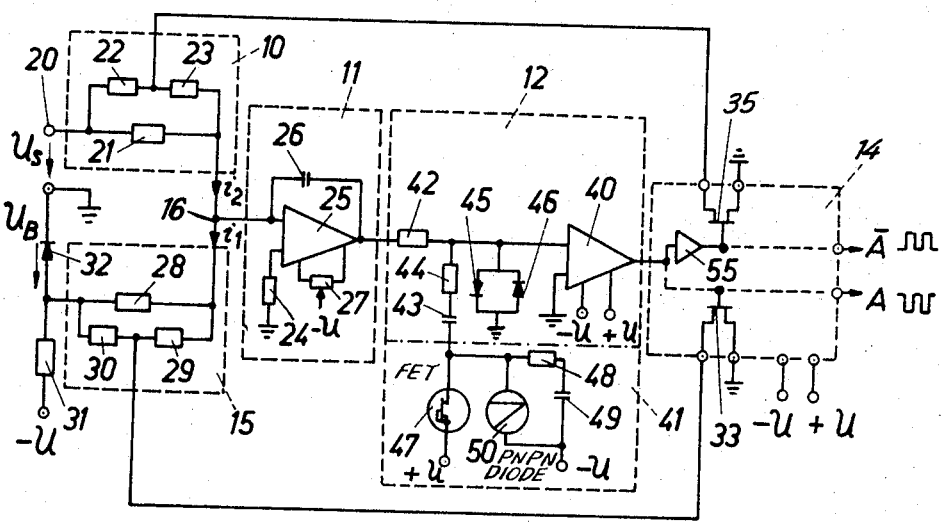
FIG. 2 is a detailed circuit diagram of the control apparatus in accordance with the preferred embodiment of the invention.

After having described the circuit generally, we now proceed to the description of details, and here we refer to FIG. 2. Considering first input network 10, the input voltage $Us$ is applied particularly between an input terminal 20 of that network 10 and ground. The network 10 is comprised of a parallel circuit that includes a resistor 21 across which are connected two, serially connected resistors 22 and 23. The junction of resistors 22 and 23 is connected to one main electrode of a field effect transistor 35 as switching element, having its other main electrode grounded. The field effect transistor 35 pertains to switching circuit 14 which is constructed as integrated circuit. Transistor 35 is controlled by a pulse train $\bar{A}$ that is the inversion of train A. This way, effective resistance control is obtained in network 10 at the complementary duty factor provided for amplifier OA.

The return or reference terminal of the reset action circuit 11 is connected to ground via a resistor 24. Integrator 11 includes primarily a high gain amplifier 25. A capacitor 26 is connected across input and output of high gain amplifier 25 to obtain integration. The integrating operational amplifier 11 includes in addition a potentiometer 27 for bias and supply voltage control of amplifier 25 and having a tab connected to a terminal that provides constant, negative voltage $-U$.

The signal input terminal of amplifier 25 receives a current $i_2$, as stated, from network 10 via summing point 16 to which is connected additionally the output of resistance circuit 15, denoted in the following also pulse converter 15. Pulse converter 15 is comprised of a resistor 28 across which are connected two resistors 29 and 30; they are connected in series to each other. The junction of resistors 28 and 29 is connected to summing point 16, while the junction of resistors 28 and 30 connects to a junction between a series circuit that is comprised of a diode 32 and of a resistor 31. The elements 31 and 32 are connected respectively between $-U$ and ground, the connection is made so that diode 32 is back biased. This way, a reference value $U_B$ is established across diode 32 and effective at the common junction of elements 31, 32, 28, 30.

The junction between the resistors 29 and 30 connects to another field effect transistor 33, particularly to the one main electrode thereof. The other main electrode of the field effect transistor 33 is connected to ground. Transistor 33 pertains also to the IC switching circuit 14. The gate of transistor 33 receives the pulse train A, un-inverted, so that effective resistance control for network 15 is provided at the same duty factor for the switching operation as provided by transistor ST.

The output signal of integrator 11 is fed to one input of a comparator 40 via a resistor 42; the elements 40 and 42 pertain to the pulse generator 12. Reference potential for comparator 40, as the other input signal, is taken from ground; comparator 40 is additionally biased by +U and −U as supply, essentially establishing the two output levels thereof. The first signal input for comparator 40 receives additionally the output of a sawtooth generator 41 via a series RC coupler circuit that includes resistor 44 and coupling capacitor 43. Resistors 42 and 44 form a junction, and they provide summing action for the signal that is to be applied to the signal input of comparator 40. In addition, two diodes 45 and 46 are connected in opposition between that signal input terminal of comparator 40 and ground, to provide overload protection.

The sawtooth generator 41 is part of the pulse generator 12 and includes a capacitor 49 connected in series with a current limiting resistor 48. Parallel to the two elements 48 and 49 is connected a switching diode 50 of the PNPN variety. The junction between capacitor 49 and diode 50 connects to −U; the junction between diode 50 and resistor 49 is connected to capacitor 43. That latter junction connects in addition to the source-drain path of a field effect transistor 47, which, in turn, is connected to receive supply voltage +U. The gate of field effect transistor 47 is connected to the same main electrode that receives the positive operating voltage +U. Field effect transistor 47 is used as constant current source for charging capacitor 49 with a constant current and, therefore, at a constant rate, so as to obtain a linear contour of the generated sawtooth wave.

The output of comparator 40 is connected directly to terminal 13 and provides pulse train A. Additionally comparator 40 is connected to the input of an inverter 55, providing inverted pulses as complementary pulse train Ā and controlling transistor 35. The pulse train A controls directly the gate of field effect transistor 33. The inverter 55 pertains also to the IC switching circuit 14. As symbolically indicated, operating voltages −U and +U are supplied to the IC circuit. There may be additional elements included in the IC chip that holds switching circuit 14, but they are omitted as not being pertinent as far as explaining this invention is concerned.

The production of pulse trains A and Ā is now provided in the following manner. Capacitor 49 charges with constant current. As the voltage across capacitor 49 reaches the firing voltage of PNPN diode 50, the latter fires and discharges capacitor 49 via limiting resistor 48. If the discharge current drops below the sustaining current for conduction of diode 50, current therein extinguishes, and capacitor 49 begins to charge again, etc.

Therefore, it can be seen that a periodic charging and discharging operation of capacitor 49 takes place, and the junction of field effect transistor 47 and resistor 48 provide the sawtooth output voltage. The frequency of this sawtooth oscillation is determined by the elements which determine the current flow and charge rate of capacitor 49 in the circuit. For this, particularly impedances of FET 47 and resistor 48 are controlling.

The sawtooth voltage thus produced, controls one component of the principle signal input of comparator 40. As long as the sawtooth voltage remains below the response threshold of comparator 40, a first level is provided at the output of the comparator (e.g. −U) corresponding, for example, to a pause in pulse train A and to a pulse in train Ā. As soon as the sawtooth voltage exceeds the response threshold, comparator 40 provides the respective other output corresponding to a pulse of train A and a pause in train Ā. As a sawtooth oscillation, output of oscillator 41, drops below comparator threshold, the output of the comparator drops accordingly back to the other level and so forth.

Now, it has to be considered that an additional input is provided for comparator 40; it consists of the output of integrating amplifier 11. That output voltage is added to the sawtooth voltage as provided by sawtooth oscillator generator 41 via capacitor 43. Accordingly, the response of the comparator 40 as to change in output signal level is changed by operation by that added voltage. Therefore, the width of pulses A is controlled by variations in the integrator output. Of course, for a constant amplitude of signal produced by circuit 11 the pulse width remains constant.

As far as a control system is concerned, the object and problem may be as follows and is posed two-fold: (1) a parameter of the controller C in the system is to be changed in dependence upon a control voltage $U_s$; (2) the change of the parameter is to be determined in accordance with a function so that the transfer function of the controller is determined by $F = f(U_s)$.

It is now presumed that the transfer function of the controller generally can be made subject to control in that an effective resistance within the controller C is controlled by a pulse train, as shown representatively in the upper part of FIG. 1. Details of the various possibilities here, i.e., details as to control of any of the various types of parameters (gain, time constants etc.) are disclosed in the said copending application and has been summarily explained with reference to the upper part of FIG. 1. Therefore, the two fold problem reduces to the problem that the width of the pulses A of the parameter controlling pulse train for controller C, must (1) be made dependent upon the control signal $U_s$, so that (2) the resulting transfer function $F = f(U_s)$ is obtained via width modulating the interposed pulse train that provides switching for effective resistance and, therefor, parameter control in the regulator.

This then reduces the task to the problem of designing the circuit that produces the train A of switching pulses so that the variations in width as undergone by operation of modulator control input $U_s$ causes the controller to respond so that its transfer function is controlled as desired in response to signal $U_s$. In other words, a particular relationship $A = A(U_s)$ must be provided for width control of pulses in dependence upon A.

The determination of the needed relationship $A = A(U_s)$, i.e., the functional relation of pulse width as dependent upon input signal $U_s$ is reasonably preceded by determination how the controller transfer function $F$ does in fact vary in response to the applied switching pulses A. The relationship could be stated as $F = G(T_e/T_i)$ wherein the function $G$ denotes the dependence of the quantitative structure of transfer function $F = F(U_e)$, upon the duty factor of the switching operation as provided by switch ST in response to pulse train A. Assuming this relationship $F = G(T_e/T_i)$ is known, i.e., has been determined as part of the design consideration of controller C, the control apparatus producing pulses A has to be constructed to match that relationship for providing the relation $F = f(Us)$.

First, it must be determined between which limits the transfer function of controller C is to be changed. The limits of transfer function variations are determined by the limit states of switching element ST, i.e., when either permanently closed or when permanently open, corresponding to upper and lower value of the resistance that is being controlled in controller C by the pulse train A. The calculation of a mean value of the output of the controller for a particular value $Ue$ then establishes a linear relationship between pulse width or duty factor $T_t/T_i$ and controller output. Thus, the transfer function of the controller C is presumed to vary linearly with the duty factor $T_t/T_i$. This is not necessarily so, as non-linear resistances may be included in the input network of amplifier OA as controlled by switch ST. However, the determination of the functional relationship between duty factor (pulse width) and control voltage $Us$ is simplified, if there is linear relationship.

After having determined, e.g., calculated the values for the transfer function for three values of $T_t/T_i$, namely for 0, an intermediate value X, and 1, the particular values for the control voltage $Us$ are determined that are to produce these particular values for the transfer function. Usually, there is then a first range for $Us$, where the duty factor is to remain 0 (switch ST opens continuously), as the transfer function of the controller remains constant. There is a different range for $Us$ where the transfer function is also to remain constant but in a different configuration corresponding to a duty factor of 1 (switch ST closed continuously). And there is a transition range where the variation proper of the transfer function occurs.

The providing of the needed relationship between $T_t/T_i$ and $Us$ is established mainly through appropriate proportioning and dimensioning of the resistances in networks 10 and 15. These resistances, in appropriate combination, determine the behavior of the control apparatus that produces the pulses A. In order to provide for that control operation, the circuit shown in FIG. 2 must be considered in great detail.

The essential function of converter 15 is to process the pulses A as representing $T_t/T_i$ so as to provide a current $i_1$. For this, resistors 28, 29 and 30 cooperate with the reference voltage UB as provided by the referencing diode 32. The field effect transistor 33 controls effective resistance in the converter 15. Thus, the train A is used for effective resistance control within a first feedback loop that pertains to the control apparatus providing the variable width pulses A for the controller C. Resistor 28 is provided to determine that point where the sawtooth peak just reaches the switching level of the threshold level of comparator 40. For this point, there is the following rule: field effect transistor 33 must still be continuously conductive at the maintained level of the output of comparator 40 whereas transistor 35 is just about completely blocked.

The control voltage $Us = Usa$ is that voltage that drives a current $i_{2a}$ via network 10 into summing point 16 and which is equal to a current $i_{1a}$ as provided by reference UB and resistor 28, to maintain that limit condition. $U_{sa}$ is thus the critical voltage from which on the device begins to create pulses. For $Us$ $Usa$ integrator 11 is maintained at saturation, whereby the current $i_2$ is below current $i_1$, and the output voltage of the integrator is too low so that the sawtooth voltage, when added thereto, still does not reach the switching level of comparator 40.

For $Us > Usa$ pulses are produced and integrator 11 always insures that current $i_1$ and $i_2$ are equal. This is particularly obtained in that the pulse train A on one hand, as controlling field effect transistor 33, causes the effective resistance in converter 15 to be such that $i_1$ tracks $i_2$ to maintain zero current in summing point 16. Integrating circuit 11, pulse generator 12 and pulse converter 15 provide a feedback loop in which the current $i_1$ is always opposite equal to the current $i_2$. On the other hand, network 10 is likewise subject to resistance control, namely via field effect transistor 35 as controlled by the complementary pulse train, and that double feedback provides for the desired function. The two field effect transistors 33 and 35 are controlled to be conductive and nonconductive in alternating sequence within the operating range.

Resistances 29, 30, 22 and 23 are now adjusted so that for particular control voltage $Usx$, $T_t/T_i = X$. The upper end of the variation range is to be obtained for a value $Use$ where $T_t/T_i = 1$. Comparator 40 will produce the corresponding steady output when the integrator output is so high that, when added to lowest level of a sawtooth oscillation, comparator 40 will still not produce change. This upper end of the operating range is determined particularly by resistor 21 for that particular value use. Now, transistor 33 is cut off always, transistor 35 conducts continuously. For higher values of $Us$ the current $i_2$ will exceed $i_1$ and the integrator goes into saturation in the opposite sense.

Figure 3:
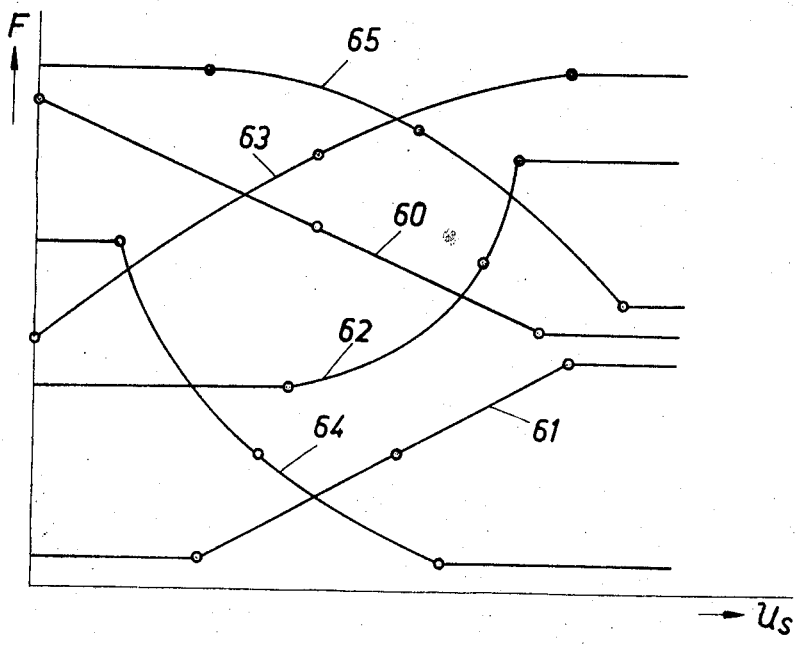
FIG. 3 shows representative diagrams of transfer function control in dependence upon a control voltage, for example, on a normalized or any suitable scale.

FIG. 3 illustrates a diagram for several functions $F = f(Us)$ in accordance with which the parameters of the controller are made subject to adjustment by means of the particular control apparatus illustrated. The ordinate F represents, on a generalized basis, the transfer function of controller as depending upon variation of a parameter that, in turn, is controlled by signal $Us$ via the control apparatus. As already mentioned, three points can be selected within the range or function plane and through which the function is to be determined. These three points are beginning, ending and an intermediate point. The function may be linear with upward or downward slope. For example, line 60 illustrates a function wherein the resistors are adjusted so that F has maximum value for $Us = 0$ (and negative values should they occur). For a particular value for $Us$, the transfer function is to reach a minimum to be maintained for larger $Us$. For an in-between value, as additionally provided, the curve is to have such a contour that in fact the particular function $F = f(Us)$ is linear.

The transfer function 61 is another example. It is to provide a first, constant value up to a particular value for $Us$. The function is to increase linearly up to another point and is to remain constant beyond that particular level. The intermediate point establishes again linearity.

It is important to note that a negative or a positive slope for transfer function F can be obtained by selecting either A or Ā as switching pulses in the controller. Thus, for purposes of practicing the invention generally, these two pulse trains should be regarded as equivalent, and it is primarily a matter of practicality which one to employ and how to select polarities.

The invention is most certainly not restricted to the generation of linear functions. For example, curves 62, 63, 64, 65, show different kinds of nonlinear functions and here, of course, the in-between points become particularly important in order to determine non-linearity and degree of curvature to be obtained. The beginning and end points of a function can be arbitrarily placed within the first or second quadrant of a function plane (i.e., Us may have either polarity). However, in each case prior to the beginning point and beyond the end point, the transfer function runs parallel to the abscissa (Us). That, however, may occur outside of the range of actually occurring values for Us.

Control of the transfer function may be effective within controller C in various ways depending upon the type of controller C and depending upon the particular use that is being made. Thus, the transfer function control in dependence upon a control signal Us is applicable equally to proportional, reset action or differentiating type controllers or to any combination thereof.

Parameter control of the various types of controllers is described in the copending application. The invention, as presently disclosed, permits any of the relevant components to be controlled by a signal Us as parameter control in the regulator. Thus, transfer function control as here understood, may involve overall gain or relative gain to adjust the degree of participation of proportional, integral and/or derivation components in the regulator. Also, time constant of integration and differentiation processes can be controlled in that manner.

It is apparent that the inventive control device is particularly important for nonlinear feedback control systems where, for example, the several control parameters, such as gain, reset and rate action, are to be subject to adjustment individually or in any possible combinations, even in dependence upon the error signal Ue in a complex fashion. A particularly interesting field of application is flight controllers in which, for example, control parameters are to vary in dependence upon the effective dynamic pressure, i.e., in dependence upon the speed of the aircraft. The speed dependent signal may provide the control voltage Us. The relation between that speed dependent signal and the controller can be made so that the controller is operated at its optimum for the different speeds.

Generally it can be said that the inventive control device can be used wherever the parameter of an automatic control device is to be changed in accordance with a particular physical characteristics and environmental factors. Due to the high degree of accuracy obtainable within the controller, multiple controller systems can be realized to obtain redundancy systems. The controllers are made to operate in parallel in precise synchronism. Due to the utilization of semiconductor elements, the control apparatus is highly accurate and reliable and does not require large expenditures. Moreover, the device is rather insensitive to temperature changes. The particular design for a particular case requires only a simple calculation for dimensioning the elements employed. This is an advantage and particularly important for optimizing control operations and for maintaining optimization by parameters, so as to change the transfer function of the controller.

The invention is not limited to the embodiments described above but all changes and modifications thereof not constituting departures from the spirit and scope of the invention are intended to be included.

We claim:

1. Control apparatus for providing a train of pulses, the width of the pulses to vary in dependence upon a control signal, the dependence to represent a particular function within a particular range for the control signal, the apparatus having a pulse generator for providing a pulse train and having a variable signal input terminal, the improvement comprising:

input means for the pulse generator and connected between a source for the control signal and said terminal and including plural components including a network of interconnected resistances; and a switching circuit connected to be responsive to the output of the pulse generator and providing switching operation in the input means for controlling effective resistance in the input means in direct response as well as in response to the complement of the train of switching pulses to obtain a variation of the transfer function of the input means.

2. Control apparatus as in claim 1, the control apparatus including a resistance network connected for effective resistance control by the switching means in dependence upon the train of switching pulses, and an integrator connected to receive the control signal as input via the network, the integrator output controlling the pulse generator.

3. Control apparatus for providing a train of pulses, the width of the pulses to vary in dependence upon a control signal, the dependence to represent a particular function within a particular range for the control signal, the apparatus having a pulse generator for providing a pulse train and having a variable signal input terminal, the improvement comprising:

input means for the pulse generator and connected between a source for the control signal and said terminal and including plural components including a network of interconnected resistances;

the input means including a first resistor, and two series connected resistors connected across the first resistor; and a switching circuit including electronic switching means connected to be responsive to the output of the pulse generator further connected to effectively short circuit one of the series connected resistors for obtaining variation of the transfer function of the input means.

4. Apparatus as in claim 3, the control signal being applied to the first resistor at one end, to be modified by the resistances of the resistors, the modified signal effective in the pulse generator.

5. Apparatus as in claim 3, a biasing voltage being applied to the first resistor, the control signal being fed to additional resistors connected to the three resistors to obtain a combined input effective on the pulse generator.

6. Control apparatus as in claim 1, the input means including a plurality of first interconnected resistors, connected to receive the control signal, and a plurality of second resistors, connected to receive a biasing signal, the switching means including first means connected for controlling effective resistance of the first interconnected resistors, further including second means connected for controlling effective resistance of the second interconnected resistors, third means for connecting one of the first and second means to be responsive to the pulses of the train, and the other one to be responsive to complementary pulses of the train; and means for connecting the first and second resistors to obtain an input for the pulse generator.

7. Control apparatus as in claim 6, the input being applied directly to an integrator providing an output as input to the pulse generator, operating for pulse width control to obtain zero input for the integrator.

8. Control apparatus as in claim 7, the pulse generator including a comparator and a sawtooth generator, the comparator receiving the combined integrator output and sawtooth generator output.

9. Control apparatus for providing a train of pulses, the width of the pulses to vary in dependence upon a control signal, the dependence to represent a particular function within a particular range for the control signal, the apparatus having a pulse generator for providing a pulse train and having a variable signal input terminal, the improvement comprising:

the pulse generator having an output terminal;

input means for the pulse generator and connected between a source for the control signal and said input terminal and including plural components including interconnected resistances; and a switching circuit connected to be responsive to the output of the pulse generator and providing switching operation in the input means for variation of the transfer function of the input means;

the switching circuit including an inverter connected to the output terminal, a first field effect transistor having its gate connected to the inverter output, a second field effect transistor having its gate connected to the output terminal, the field effect transistors being alternatingly rendered conductive and connected to provide complementary switching operations in the input means.

10. Control apparatus as in claim 9, the input network including two resistances, the transistors providing effective resistance control respectively through short circuiting of the resistances.

11. Apparatus connected to a controller that processes an error signal in accordance with a transfer function determined by at least one parameter, the controller including resistances that determine the parameter, there being a switch connected to the resistances to provide intermittent switching action for effective resistance and parameter control, the switch provided to respond to a train of pulses, the apparatus comprising:

a voltage controlled pulse generator having output connected to the switch for providing thereto pulses having width depending upon voltage control;

a resistive input network connected to receive a control voltage, further connected to receive the width modulated switching pulses in feedback configuration, for controlling effective resistance of the network in dependence upon the width of these pulses; and circuit means connecting the network to the generator to provide the voltage control thereto as modified by the controlled resistance of the network for obtaining pulse width modulation to be effective as variable duration switching signals for the switch as controlling effective resistance of the resistances as connected to the controller.

12. Apparatus as in claim 11, the input network including a biasing source, the circuit means including an integrator, the connection between generator output and network providing reset action feedback control for function generation.

13. Apparatus as in claim 11, the connection including double connection means for controlling the network separately in dependence upon the pulses and the inverted pulses.

* * * * *